United States Patent [19]

Katsaros et al.

[11] Patent Number: 5,408,000

[45] Date of Patent: Apr. 18, 1995

[54] BLOW MOLDABLE THERMOPLASTIC POLYAMIDE COMPOSITION

[75] Inventors: James D. Katsaros, Houston, Tex.; Pallatheri M. Subramanian, Hockessin; Donald R. Swain, Middletown, both of Del.

[73] Assignee: E. I. Du Pont de Nemours and Company, Wilmington, Del.

[21] Appl. No.: 93,636

[22] Filed: Jul. 19, 1993

Related U.S. Application Data

[63] Continuation-in-part of Ser. No. 743,625, Aug. 12, 1991, abandoned.

[51] Int. Cl.⁶ ............................................. C08L 77/00
[52] U.S. Cl. ..................................... 525/179; 525/182
[58] Field of Search ................................. 525/179, 182

[56] References Cited

U.S. PATENT DOCUMENTS

| | | | |
|---|---|---|---|
| 4,804,703 | 2/1989 | Subramanian | 524/444 |
| 4,900,788 | 2/1990 | Subramanian | 525/160 |
| 4,966,941 | 10/1990 | Subramanian | 525/66 |
| 5,013,786 | 5/1991 | Payne et al. | 524/514 |
| 5,047,478 | 9/1991 | Ohmae et al. | 525/183 |
| 5,064,700 | 12/1991 | Yasue et al. | 428/36.92 |
| 5,091,478 | 2/1992 | Saltman | 525/179 |
| 5,094,806 | 3/1992 | Laughner | 264/523 |

FOREIGN PATENT DOCUMENTS 265527 5/1988 European Pat. Off.
WO90/07555 7/1990 WIPO.

*Primary Examiner*—Ana L. Carrillo
*Attorney, Agent, or Firm*—Marilyn H. Bromels

[57] ABSTRACT

A flexible, thermoplastic, blow moldable composition which comprises a substantially homogeneous blend of A) about 40–60 wt. % polyamide, B) about 20–58 wt. % of a first ethylene copolymer selected from the group consisting of copolymers of ethylene and at least one alpha, beta ethylenically-unsaturated carboxylic acid having 3–8 carbon atoms, and ionomers of said ethylene copolymers, C) about 1–20 wt. % of a second ethylene copolymer having interpolymerized units of ethylene and 1–10 wt. % of an alpha, beta ethylenically-unsaturated aliphatic epoxide, and D) 0.1–0.6 wt. % fibrillatable polytetrafluoroethylene or fibrillatable modified polytetrafluoroethylene.

9 Claims, No Drawings

BLOW MOLDABLE THERMOPLASTIC POLYAMIDE COMPOSITION

RELATED APPLICATION

This application is a continuation-in-part of application Ser. No. 07/743,625, filed Aug. 12, 1991, now abandoned.

FIELD OF THE INVENTION

This invention relates to flexible blow moldable thermoplastic polyamide graft compositions having excellent high temperature properties and low temperature toughness.

BACKGROUND OF THE INVENTION

Polyamide compositions are known to exhibit enhanced high temperature properties and are widely used as engineering plastic molding materials. Such compositions, however, have poor melt strength and are difficult to process by blow molding, the process which is most commonly used on an industrial scale to form hollow containers. Consequently, hollow polyamide containers which have outstanding high temperature properties have not been readily available.

One solution to this problem has been to blend the polyamide compositions with materials which increase melt strength and modify melt viscosity. For example, it is disclosed in U.S. Pat. No. 4,804,703 that when mixtures of fibrillatable fluoropolymer resins and ionic copolymers of ethylene with alpha, beta-unsaturated carboxylic acids are added to mineral-reinforced semi-crystalline polyamides compositions are produced which are readily processible by blow molding. Mineral reinforced polyamides are, however, quite stiff compositions which are not suited for use in applications in which a substantial amount of flexibility is required, such as impact-resistant containers, especially large containers which are designed for applications in which both high and low temperatures are encountered, for example automotive air ducts and resonators. Thus, there exists a need in the art for a polyamide composition which has outstanding properties over a broad range of temperatures, and, in addition, is flexible as well as blow moldable.

SUMMARY OF THE INVENTION

It has now been found that flexible, blow moldable polyamide compositions which exhibit good high temperature tensile properties as well as low temperature toughness can indeed be produced. These novel compositions are polymer alloys which comprise a) a polyamide, b) a copolymer of ethylene and at least one alpha, beta-unsaturated carboxylic acid or ionomer thereof, c) a copolymer of ethylene and an epoxide, and d) a fibrillatable fluoropolymer.

In particular, the thermoplastic blow moldable composition comprises a blend of (a) about 40–60 wt. % polyamide,
(b) about 20–58 wt. % of a first ethylene copolymer selected from the group consisting of copolymers of ethylene and at least one alpha, beta ethylenically-unsaturated carboxylic acid having 3–8 carbon atoms and ionomers of said ethylene copolymers,
(c) about 1–20 wt. % of a second ethylene copolymer having interpolymerized units of ethylene and 1–10 wt. % of an alpha, beta ethylenically-unsaturated aliphatic epoxide, and
(d) 0.1–0.6 wt. % fibrillatable fluoropolymer.

DETAILED DESCRIPTION OF THE INVENTION

The polymer compositions of the invention are flexible heat-resistant thermoplastic polyamide compositions which are specially adapted for blow molding. They possess a partially grafted structure and a polyamide continuous phase. The partially grafted structure results from reaction of the ethylene/epoxide copolymer component of the composition with both the polyamide component and the ethylene/acid copolymer component. It is this morphological feature which is believed to be responsible for the combination of strength and flexibility exhibited by the novel compositions of the invention. Because the polyamide component is the continuous phase the compositions also exhibit excellent high temperature tensile strength, while the incorporation of fibrillatable fluoropolymer imparts the melt strength necessary for blow moldability. By excellent high temperature strength it is meant that the compositions exhibit at least 30% retention of tensile strength when tested at 150° C. versus the value obtained by testing at 23° C. and that retention of 23° C. elongation at break after heat aging at 150° C. for fourteen days is over 30%.

Polyamide resins useful in the practice of the invention are well-known in the art and include those described in U.S. Pat. Nos. 4,174,358; 3,393,210; 2,512,606; 2,312,966; and 2,241,322. Included among these are semi-crystalline and amorphous resins having molecular weights of at least 5000 which may be produced for example by condensation polymerization of equimolar amounts of saturated dicarboxylic acids containing from 4 to 12 carbon atoms with diamines, by ring opening polymerization of lactams, or by copolymerization of polyamides with other components, e.g. to form polyether polyamide block copolymers. Examples of polyamides include polyhexamethylene adipamide (nylon 66), polyhexamethylene azelaamide (nylon 69), polyhexamethylene sebacamide (nylon 610), polyhexamethylene dodecanoamide (nylon 612), polydodecamethylene dodecanoamide (nylon 1212), polycaprolactam (nylon 6), polylauric lactam, poly-11-aminoundecanoic acid, and copolymers of adipic acid, isophthalic acid, and hexamethylene diamine. Preferred polyamides include those polyamides having melting points below 230° C., for example, nylon 6, nylon 612, and nylon 1212. The polyamide component of the composition should be present in amounts of about 40–60 wt. %, preferably 45–50 wt. %. If less than about 40 wt. % is present, the high temperature properties of the composition are compromised, whereas if greater than 60 wt. % is present low temperature toughness is affected.

The ethylene/acid copolymer component of the composition is either a copolymer of ethylene and at least one alpha, beta ethylenically-unsaturated carboxylic acid or an ionomer thereof. The carboxylic acid may contain 3 to 8 carbon atoms, preferably 3–6 carbon atoms, and is present in the copolymer at levels of 5–15 wt. %. Examples of such copolymers include ethylene/acrylic acid, ethylene/methacrylic acid, ethylene/methacrylic acid/n-butyl acrylate, ethylene/acrylic acid/ethyl vinyl ether, ethylene/methyl acrylate/monoethyl hydrogen maleate, ethylene/ethyl acrylate/monoethyl hydrogen fumarate, and ethylene/itaconic acid. Preferably the ethylene/a- cid copolymer is a terpolymer of ethylene, an alkyl acrylate, and methacrylic acid, and, most preferably, the alkyl acrylate is n-butyl acrylate because low temperature toughness is enhanced in such compositions.

Ionomers of the ethylene/acid copolymers may be used in place of the copolymers themselves. The acid groups of the ionomer are generally 10–90% neutralized with monovalent, divalent, or trivalent metal ions to form ethylene/acid copolymer salts. Preferably, the degree of neutralization is 50–90%. Suitable metal ions include sodium, zinc, aluminum, magnesium, potassium, calcium, and lithium. It is preferable that the ethylene/acid copolymer be an ionomer because higher strength is thereby imparted to the compositions of the invention. The ethylene/acid copolymer or ionomer is present in the compositions of the invention in amounts sufficient to provide adequate flexibility and low temperature properties, preferably about 20–58 wt. %.

An important feature of the invention is the presence in the composition of the ethylene/alpha, beta ethylenically-unsaturated aliphatic epoxide copolymer component. This copolymer is capable of undergoing grafting reactions with both the polyamide and the ethylene/acid copolymer component. The copolymer contains copolymerized units of ethylene and alpha, beta ethylenically-unsaturated aliphatic epoxides. The unsaturated epoxides contain 4–20 carbon atoms and are present in the ethylene copolymer at levels of 1 to 10 wt. %, preferably 3–6 wt. %. Representative examples include glycidyl acrylate, glycidyl methacrylate, allyl glycidyl ether, vinyl glydicyl ether, glycidyl itaconate, and 3,4-epoxybutyl methacrylate. Preferably the copolymer also contains copolymerized units of $C_1$ to $C_{12}$ alkyl esters of either acrylic or methacrylic acid. When copolymerized alkyl acrylates or methacrylates are present in the copolymer it is preferred that they be present at levels of at least 20%. Examples of suitable monomers include, for example, methyl acrylate, ethyl acrylate, butyl acrylate, ethyl hexyl methacrylate, methyl methacrylate, dodecyl methacrylate, and dodecyl acrylate. Butyl acrylate is preferred because low temperature impact is optimized in compositions of the invention when the ethylene/alpha, beta ethylenically-unsaturated aliphatic epoxide copolymer contains copolymerized butyl acrylate. Preferred ethylene copolymer grafting agents are ethylene/n-butyl acrylate/glycidyl methacrylate and ethylene/methyl acrylate/glycidyl acrylate. The level of ethylene/epoxide copolymer in the polymeric blend composition should be between about 1 and 20 wt. %. Levels of less than 1 wt. % result in insufficient grafting and levels higher than 20 wt. % result in so high a level of grafting that the compositions become intractable.

The fibrillatable fluoropolymers useful in the compositions of the invention are preferably those tetrafluoroethylene polymers which are made by the dispersion or emulsion polymerization process, in which the polymer particles remain dispersed in the reaction mix during the polymerization. The particles fibrillate under the influence of shear forces while being mixed with the polyamide and ethylene copolymer components of the composition of the invention. Fibrillatable fluoropolymers are well known in the art and are available commercially. Such compositions are, for example, described in U.S. Pat. Nos. 3,142,665 and 4,016,345. Commercially available types include Alphaflex ® polytetrafluoroethylene resin, available from Alphaflex Industries, Inc. and Teflon ®TFE fluorocarbon resin grades 6, 60, 6C and 62, available from E. I. Du Pont de Nemours & Co. The level of fibrillatable fluoropolymer in the polymeric blend ranges from 0.1–0.6 wt. %. At these levels sag resistance and melt strength of the blend compositions are high enough so that they may be blow molded. In addition, low temperature toughness is excellent when the level of fibrillatable fluoropolymer is within this range. Certain fibrillatable tetrafluoroethylene polymers, particularly those having high degrees of fibrillation, have a tendency to agglomerate on extrusion. It is therefore preferable to employ fibrillatable tetrafluoroethylene polymers having moderate degrees of fibrillation to prepare the blends of the invention so that the fibrillatable fluoropolymer is dispersed in the blend in a substantially uniform manner.

The polymer blends, i.e. alloys, of the invention are preferably produced by melt blending under high shear conditions. The separate ingredients may be combined as a pellet blend or they may be mixed via simultaneous or separate metering of the various components. They may also be divided and blended in one or more passes into one or more sections of high shear mixing equipment, for example extruders, Banbury mixers, or kneaders. High shear conditions insure that proper dispersion of the components occurs which promotes the grafting reaction and formation of the polyamide continuous phase. These compositions may then be extrusion blow molded to form hollow containers. Blow molded parisons produced from the alloys are sufficiently tough to resist fracture upon being dropped from heights of ten feet at temperatures of 0° C., some compositions being able to resist fracture at temperatures as low as −40° C. Also, the alloys exhibit excellent fracture resistance as determined by the Notched Izod test, even at temperatures as low as −30° C. In addition, containers having volumes as large as 18 gallons hang with good integrity, i.e. minimal sagging, during the blow molding process, and they maintain uniform wall thicknesses, all of which illustrates the superior melt strength associated with these materials. Furthermore, the compositions retain over 30% of their original room temperature elongation at break after aging at 150° C. for 14 days and high temperature tensile strength is not compromised. Thus, the compositions of the invention retain the enhanced high temperature tensile properties of polyamides, yet they are flexible, blow moldable, and exhibit superior low temperature toughness.

Various commonly used additives such as antioxidants, plasticizers, and fillers may be added to the polymer blends of the invention in quantities which will allow them to retain their flexibility. Such materials can be added in amounts up to 10 wt. % with no adverse effects.

Although the compositions of the invention can be used in a variety of applications, such as tubing extrusion, injection molding, and conduit coating, they are particularly suited for the production of large blow molded containers, especially containers requiring strength and toughness over a wide temperature range.

EXAMPLES

The following tests were used to evaluate the compositions of the invention.

Hang Time—Pelletized polymer resin is fed to an extrusion blow molding molding machine equipped with a one quart bottle mold. The hang time is the time measured in seconds which the extruded parison hangs with good integrity and little sag before dropping from the accumulator head die. This test is a measure of the ability of the parison to maintain uniform wall thickness in production.

Melt Tension—Performed on a Gottfert Rheotens instrument used with a Gottfert Rheograph 2001 piston rheometer according to the standard procedures given in the instruction manuals for these pieces of equipment. The piston rheometer was run at 240° C. with a 2 mm diameter die 10 mm long at a head speed of 0.067 mm/sec. The Rheotens instrument was run at take-away speeds of 1 cm/sec.

Melt Draw—Performed on the Gottfert Rheotens instrument described for the melt tension test. A strand of polymer is fed from the capillary rheometer through a set of grooved wheels at a rate of 1 cm/s. Compositions which are able to maintain their integrity at this rate pass the test. Those which break fail the test. This test simulates the elasticity of the melt and allows one to assess the tendency of blow-molded parisons to break as they hang.

Bottle Drop—Seven 100 g, 0.95 liter (1 quart) blow molded bottles are each filled with ethylene glycol and cooled to −20° C. by refrigeration for a period of 24 hours. Each bottle is then dropped from a height of 6.1 meters (20 feet). Those which exhibit brittle shatter fail the test. This test measures low temperature impact strength and resistance to automobile fuel compositions.

Tensile Strength—ASTM D412
Elongation at Break—ASTM D412
Notched Izod—ASTM D256, Method A The following examples illustrate certain preferred embodiments of the invention wherein all amounts are in parts by weight.

Example 1

To 45 parts of nylon 6 ($M_n$ 14,000) were added 39.8 parts of a 70% neutralized zinc ionomer of ethylene/24% n-butyl acrylate/8.5% methacrylic acid terpolymer (melt index 0.5 dg/10 min), 10 parts of an ethylene/28% n-butyl acrylate/5.2% glycidyl methacrylate terpolymer (melt index 20 dg/10 min), 0.25 parts of a fibrillatable polytetrafluoroethylene resin (Alphaflex I ® polytetrafluoroethylene resin), 1.0 parts zinc stearate, 2.0 parts Ampacet ® 19238 carbon black, 1.5 parts Irganox ® 1098 [N,N'-hexamethylene-bis-(3,5-di-t-butyl-4-hydrocinnamide], and 0.5 parts Irganox 1010 ®, [tetrakis(methylene-3,5-di-t-butyl-4hydroxyhydrocinnamate)methane]. This mixture was placed in a polyethylene bag and tumble-mixed until a homogeneous blend was obtained. The resultant dry blend was melt blended in a Werner and Pfleiderer twin screw extruder having a diameter of 28 mm and a length to diameter ratio of 27.5. The screw used was a general purpose screw with vacuum capability which consisted of elements to convey the feed material from the feed zone to a melting zone in which the material was compressed and melting commenced. A further section of kneading blocks followed by reverse elements provided high shear and pressure to continue the melting and mixing processes. The reverse elements also served to provide a melt seal following which the melt was decompressed in a vacuum section. Following the vacuum zone the melt was recompressed and passed through kneading blocks and reverse elements which provided a second vacuum seal. The melt was then further compressed and mixed as it passed through the extruder and out the die. The extruder barrel and die were set at a temperature of 235° C. and the resin was extruded at a rate of 7 kg/hr. Temperature of the melt exiting the extruder die was 270° C. The melt strand exiting the extruder was quenched in water and cut into pellets. The pelletized product was dried in a vacuum oven under nitrogen and the dried resin was blow molded using an extrusion blow molding machine manufactured by Hayssen, Inc. and a one-quart bottle mold. The composition exhibited excellent melt strength as shown in Table I.

Example 2 (Comparative)

The procedure described in Example 1 was substantially repeated using the same ingredients except that no fibrillatable fluoropolymer resin was present in the composition. Properties of the composition are shown in Table I.

TABLE I

| | Example 1 | Comparative Example 2 |
| --- | --- | --- |
| Hang Time (s, 24° C.) | >30 | 9 |
| Melt Tension (cN, 240° C.) | 4 | 0.4 |
| Melt Draw (1 cm/s, 240° C.) | pass | pass |
| Bottle Drop (6m, −20° C.) | pass | pass |
| Stress/Strain Properties (ASTM D-412) Original | | |
| $T_B$ (MPa) @ 23° C. | 34.1 | 35.2 |
| $T_B$ (MPa) @ 150° C. | 10.0 | 10.7 |
| $E_B$ (%) @ 23° C. | 257 | 300 |
| After Aging @ 150° C. for 14 Days | | |
| $T_B$ (MPa) @ 23° C. | 35.3 | 34.1 |
| $E_B$ (%) @ 23° C. | 166 | 237 |
| % $E_B$ Retention | 65 | 79 |

The data indicate that the composition of the invention combines excellent high temperature properties with good low temperature toughness, and blow moldability. This is illustrated by a 65% retention of elongation at break after heat aging, 7 passes of the bottle drop test at −20° C., and a hang time of more than 30 seconds. The composition of the comparative example however would not be suitable for blow molding as can be seen by the hang time of only 9 seconds and the low melt tension which would result in parison sag during blow molding.

Example 3

Example 1 was repeated using the same amounts, ingredients, and procedure, except that 0.50 parts of fibrillatable polytetrafluoroethylene resin (Alphaflex I ® polytetrafluoroethylene resin) was used in place of 0.25 parts. Physical properties are shown in Table II.

TABLE II

| | Example 3 |
| --- | --- |
| Hang Time (s, 240° C.) | >30 |
| Melt Tension (cN, 240° C.) | 5 |
| Melt Draw (1 cm/s, 240° C.) | break |
| Bottle Drop (6m, −20° C.) | 4 pass 3 fail |
| Stress/Strain Properties (ASTM D-412) Original | |
| $T_B$ (MPa) @ 23° C. | 44.9 |
| $T_B$ (MPa) @ 150° C. | 15.4 |
| $E_B$ (%) @ 23° C. | 282 |
| After Aging @ 150° C. for 14 Days | |
| $T_B$ (MPa) @ 23° C. | 36.6 |
| $E_B$ (%) @ 23° C. | 107 |

TABLE II-continued

|  | Example 3 |
|---|---|
| % $E_B$ Retention | 38 |

Example 4

The procedure described in Example 1 was substantially repeated using the same ingredients except that 0.25 parts Teflon ® 6C polytetrafluoroethylene, a fibrillatable fluoropolymer resin, was present in the composition in place of 0.25 parts Alphaflex ® I polytetrafluoroethylene resin. Properties of the composition are shown in Table III.

TABLE III

|  | Example 4 |
|---|---|
| Hang Time (s, 24° C.) | >30 |
| Melt Tension (cN, 240° C.) | 2.5 |
| Melt Draw (1 cm/s, 240° C.) | pass |
| Stress/Strain Properties (ASTM D-412) Original | |
| $T_B$ (MPa) @ 23° C. | 39.1 |
| $T_B$ (MPa) @ 150° C. | 13.2 |
| $E_B$ (%) @ 23° C. | 249 |
| $E_B$ (%) @ 150° C. | 219 |

The data indicate that the composition of the invention combines excellent high temperature properties and blow moldability.

Example 5

Sample 5A was prepared as follows. A mixture of 45 parts of Nylon 6 ($M_n$ 14,000), 40 parts of a 70% neutralized zinc ionomer of ethylene/24% n-butyl acrylate/10% methacrylic acid terpolymer (melt index 0.5 dg/10 minutes), 10 parts of an ethylene/28% n-butyl acrylate/5.2% glycidyl methacrylate terpolymer (melt index 20 dg/10 minutes), 2 parts of Ampacet ® 19238 carbon black concentrate, 1 part zinc stearate, 1.5% Irganox ® 1098 antioxidant, and 0.5% Irganox ® 1010 antioxidant were placed in a polyethylene bag and tumble-mixed until a homogeneous blend was obtained. The resultant dry blend was melt blended in the Werner and Pfleiderer twin screw extruder of Example 1. The extruder barrel was set at a temperature of 235°-245° C. and the die was set at a temperature of 245° C. and the resin was extruded at a rate of 6.7-7 kg/hour. Temperature of the melt exiting the extruder die was 260°-265° C. The melt strand exiting the extruder was quenched in water and cut into pellets.

Sample 5B was prepared in the same manner, except that, in addition to the above-described components, 0.25 parts of a fibrillatable fluoropolymer (Teflon ® 6C fluoropolymer resin) was present as an additional component during the blending process. A further sample, Sample 5C, was also prepared in the same manner as Sample 5A, except that 0.75 parts Teflon ® 6C fluoropolymer resin was additionally present.

Samples 5A, 5B, and 5C were tested to determine Notched Izod impact strength at −20° C. and at −30° C. according to ASTM D256, Method A. Five test specimens were run per sample. The nominal specimen width was 0.132 inches. As can be seen from the results, shown in Table IV, Sample 5C, which contained 0.75 parts fibrillatable fluoropolymer, which is an amount of fibrillatable fluoropolymer outside the scope of the present invention, exhibited poor low temperature impact resistance, as indicated by complete breaks of four of the test specimens and a hinge break of the fifth specimen at −30° C. In comparison, Sample 5B, a composition of the present invention, was superior in low temperature impact strength. All test specimens of Sample 5B were non-breaking at temperatures as low as −30° C. Sample 5A, which contained no fibrillatable fluoropolymer, also exhibited superior low temperature toughness. Sample 5A is outside the scope of the present invention.

TABLE IV

| Physical Tests | Sample 5A | Sample 5B | Sample 5C |
|---|---|---|---|
| Notched Izod, −20° C. | Non-break | Non-break | Non-break |
| Notched Izod, −30° C. | Non-break | Non-break | Complete Break (4 Samples) Hinge Break (1 Sample) |

We claim:

1. A flexible thermoplastic blow moldable composition which comprises a blend of
   (a) 40–60 wt. % polyamide,
   (b) about 20–58 wt. % of a first ethylene copolymer selected from the group consisting of copolymers of ethylene and at least one alpha, beta ethylenically-unsaturated carboxylic acid having 3–8 carbon atoms and ionomers of said ethylene copolymers,
   (c) about 1–20 wt. % of a second ethylene copolymer having interpolymerized units of ethylene and 1–10 wt. % of an alpha, beta ethylenically-unsaturated aliphatic epoxide, and
   (d) 0.1–0.6 wt. % fibrillatable fluoropolymer.

2. The composition of claim 1 wherein the first ethylene copolymer is an ionomer.

3. The composition of claim 2 wherein the ionomer is 50–90% neutralized with metal ions.

4. The composition of claim 1 wherein the first ethylene copolymer is an ionomer of a terpolymer containing copolymerized units of ethylene, n-butyl acrylate, and methacrylic acid.

5. The composition of claim 1 wherein the second ethylene copolymer contains copolymerized units of glycidyl methacrylate.

6. The composition of claim 1 wherein the second ethylene copolymer has 3–6 wt. % interpolymerized units of an alpha, beta ethylenically-unsaturated aliphatic epoxide.

7. The composition of claim 5 wherein the ethylene copolymer is ethylene/n-butyl acrylate/glycidyl methacrylate.

8. The composition of claim 1 wherein the fibrillatable fluoropolymer is fibrillatable polytetrafluoroethylene homopolymer.

9. The composition of claim 1 wherein the polyamide is nylon 6, nylon 612, or nylon 1212.

* * * * *